April 9, 1935.   E. FISCHEL   1,997,412
REGULATING THE ALTITUDE OF AIRCRAFT
Filed Nov. 23, 1933   2 Sheets-Sheet 1
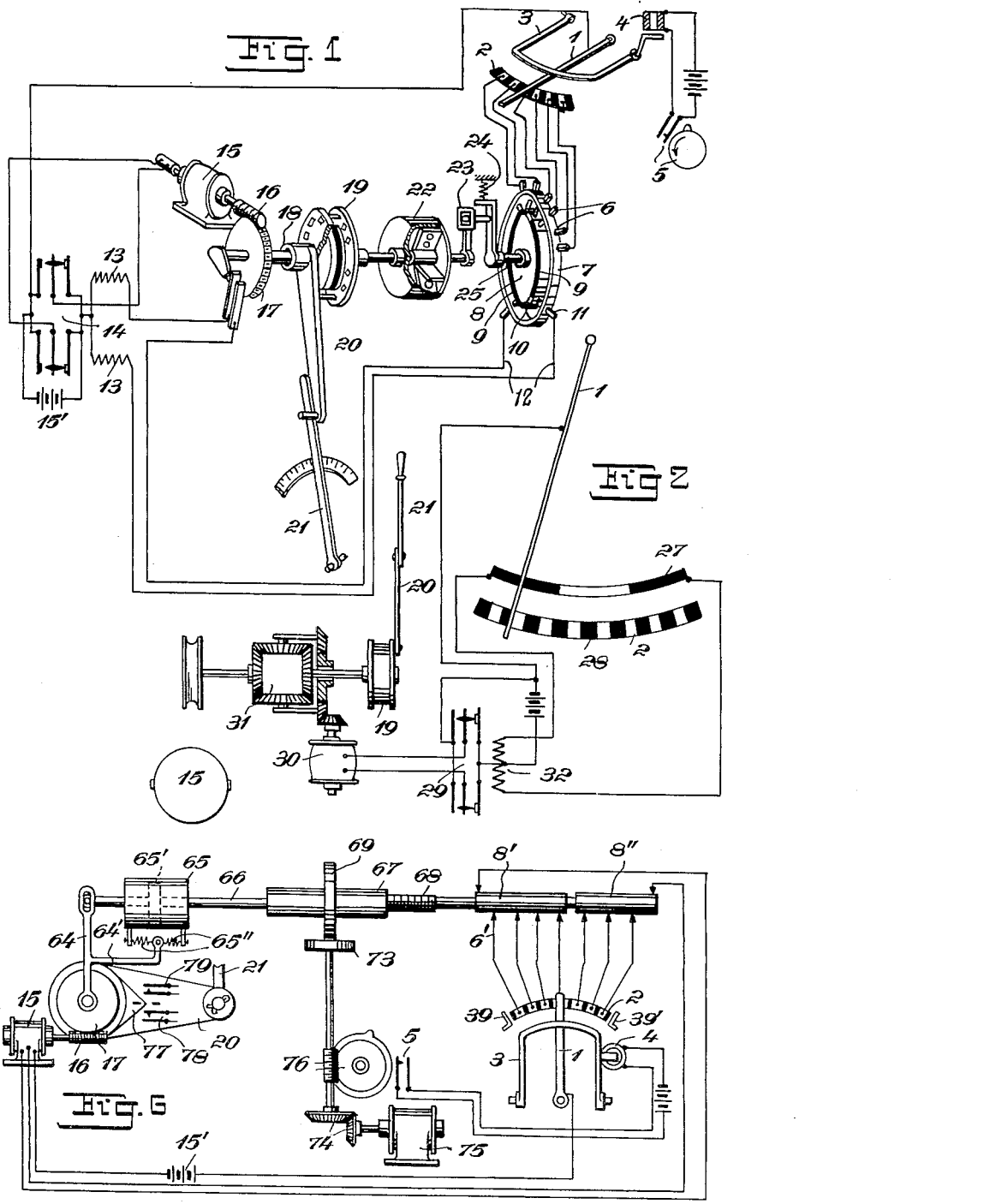
Inventor:
Eduard Fischel
by Lotka & Kehlenbeck
Attorneys

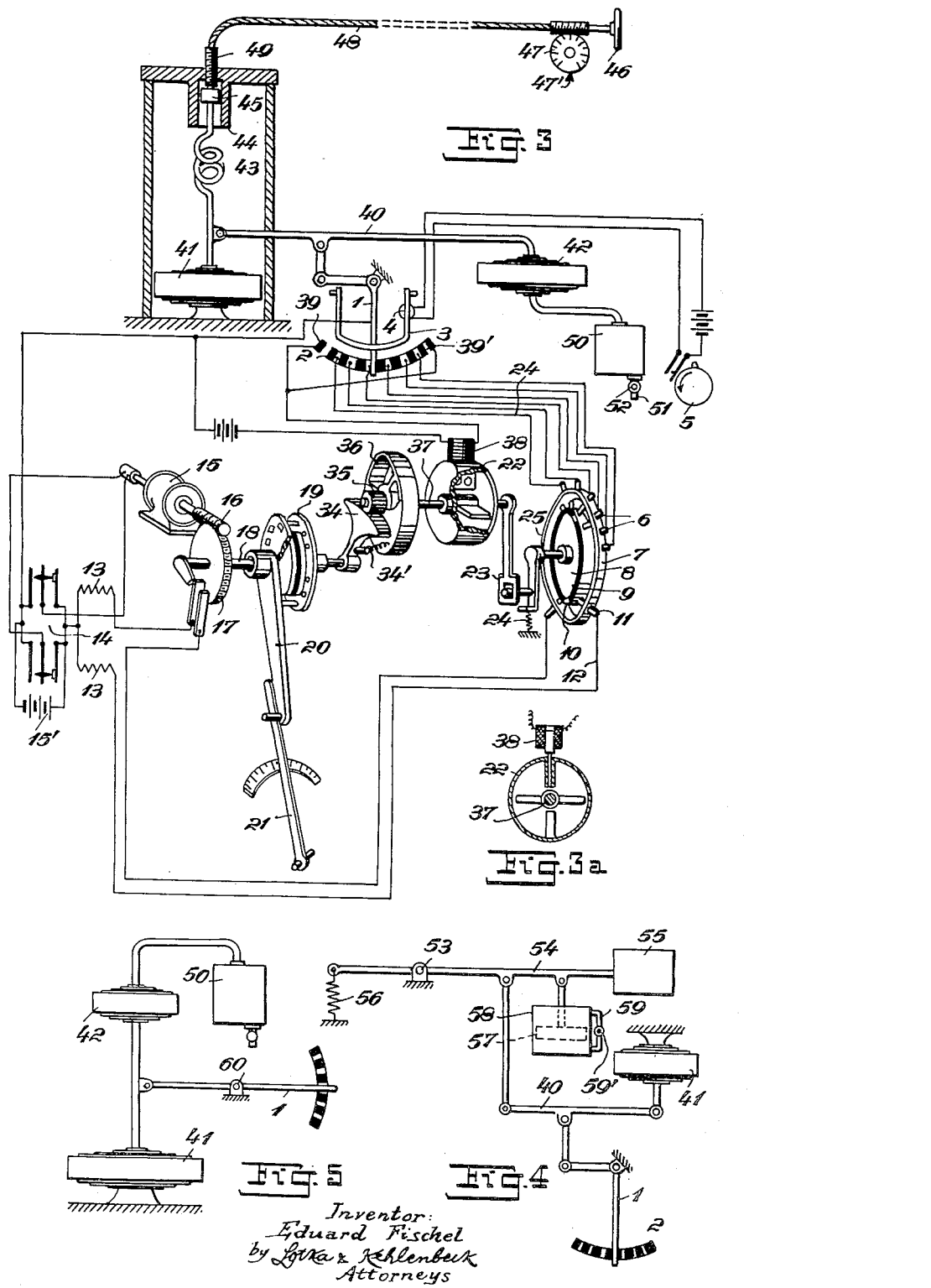

Patented Apr. 9, 1935

1,997,412

UNITED STATES PATENT OFFICE 1,997,412

REGULATING THE ALTITUDE OF AIRCRAFT

Eduard Fischel, Berlin-Charlottenburg, Germany, assignor to Siemens & Halske, Aktiengesellschaft, Siemensstadt, near Berlin, Germany, a corporation of Germany Application November 23, 1933, Serial No. 699,378
In Germany November 26, 1932

17 Claims. (Cl. 244—29)

The invention relates to regulating the altitude of aircrafts. This regulation can in a known manner be effected by displacing the altitude-rudder. It is also possible, to regulate the altitude of an aircraft by changing the propelling force, because the aircraft will ascend, if the propelling force is increasing, and descend, if the propelling force is decreasing.

An object of the invention is to provide means for automatically regulating the altitude of an aircraft, especially by automatically regulating the propelling force according to the deviations of the real altitude of flight from the desired altitude, the real altitude being measured by an altimeter.

Another object of the invention is to provide damping means in the regulating device, actuated by the altimeter and arranged for the purpose of damping or preventing pendulous movements of the aircraft about the desired altitude when it is approaching this altitude.

According to a further object of the invention means are provided which permit the regulating device of the propelling motor to be actuated by hand without rendering the automatic regulating device inoperative.

A satisfactory means for damping the oscillations of the aircraft about the desired altitude according to a further feature of the invention may comprise the combination of an altimeter and an instrument measuring the rate of change of altitude. If for example the aircraft is intended to reach a new higher altitude, the altimeter will be adjusted by the pilot to the new desired altitude and in consequence of this vary the propelling force at once very much. Thereafter the instrument measuring the rate of change of altitude will, as the rate of change of altitude always increases, gradually diminish the influence which the altimeter has upon the regulation of the propelling force and the said influence will at least be compensated in such a way that the aircraft reaches the new altitude without oscillations about the said altitude.

The said instrument measuring the rate of change of altitude of the aircraft may be a so-called variometer or any other measuring instrument not having the slow characteristics of the variometer, for example a pendulum, measuring the vertical accelerations and having a very long oscillation-period. If extreme accuracy in the regulation is desired, a pendulum measuring the true vertical accelerations may be used in addition to the above named instruments, measuring the rate of change of altitude. In such case the last named pendulum must have a short oscillation period.

Instead of the said instruments measuring the rate of change and the accelerations of altitude an altimeter may be used with means for differentiating the measuring value of the altimeter, in which way the rate of change and the acceleration of altitude will be obtained. The said altimeter may be of any known construction, for example it may be based on the well-known capacitive method.

Other features of the invention will be clear from the following description of several embodiments of the new regulating device. These embodiments are illustrated in the accompanying drawings in which Fig. 1 shows a perspective view of a simple form of the new regulating device.

Fig. 2 shows parts which may be added to the device according to Fig. 1.

Fig. 3 shows an embodiment with an altimeter and a variometer steering in combination with the regulating device.

Fig. 3ª is a detail section of a damping device included in the arrangement.

Fig. 4 shows the combination of an altimeter and a pendulum of long oscillation period as steering instruments.

Fig. 5 shows a different arrangement of part of the device of Fig. 3.

Fig. 6 shows another embodiment of the regulating device.

In the embodiment, illustrated in Fig. 1, the part 1 is the indicator of an altimeter, not shown and of any known construction, for example of the barometric type. This indicator 1 moves along the contactbank 2. The force of the movement of the indicator being not sufficient, auxiliary force may be provided for testing the position of the indicator. For example a bow 3 may be used as an auxiliary force, said bow 3 serving to press down the indicator 1 at periodic time-intervals upon the contactbank 2 and releasing it shortly thereafter. The bow 3 may be actuated by an electromagnet 4. in the circuit of which is provided a time switching device 5. The contact of this switching device may be closed by a thumb-disk, driven by a clockwork. Also other well-known forms of switching devices may be used.

Each contact of the bank 2 is connected to a brush of a set of contact brushes 6 which are mounted on an immovable ring 7 and slide upon a disk 8 having two metal coatings or electrically conductive sections each having the form of a half-ring. Between the two metal coatings or conductive sections 9 two insulated zones 10 are provided. Furthermore two brushes 11, also mounted on the ring 7, are arranged to slide upon the disk 8, these brushes 11 being connected to the terminals of two relays 13 by means of the leads 12. The contacts 14 of the relays 13 are located in the rotor circuit of a motor 15 with a current source 15'. The motor 15 drives by means of a wormgear 16, 17 the axle 18 connected with the one part of a sliding coupling, the other part of which is connected with the lever 20. The lever 20 engages the lever 21 which may also be actuated by hand and serves for regulating the one or more propelling motors of the aircraft. The above mentioned sliding coupling enables the pilot to actuate the lever 21 without being hindered by the motor 15 and the other parts coupled with the one part of coupling 19. On the axle 18 the rotor of a damping device 22, filled with oil or the like, is provided, the housing of the damping device being connected with the lever 23 in which the pin of a second lever engages, this lever having a direction-spring 24. The last mentioned lever is connected with the axis 25 of the previously mentioned disk 8.

The described arrangement acts as follows: At first the altimeter 1 or the contact bank 2 will be adjusted according to the altitude desired by the pilot to be reached and maintained. This adjustment and the means for effecting the same are well-known. After this adjustment the indicator 1 will be above that contact of the bank 2 which is connected with the brush 6 contacting the insulation zone 10 of the disk 8. In consequence of this the circuit of the motor 15 will continue to be interrupted when the indicator 1 is pressed down.

As soon as the altitude of the aircraft changes, the indicator 1 leaves its aforesaid position and moves to the one or the other side, in consequence of which during the next period of depression of the bow 3 the circuit of the relays 13 will be closed; this circuit leads from the positive terminal of the battery 15' to the indicator 1, one of the contacts of the bank 2, a brush 6, one of the half-rings 9, a brush 11, a lead 12, one of the windings 13 back to the negative terminal of the battery 15'. The deflection of the indicator being directed to the one or to the other side, the one or the other relay 13 will be actuated, which relay closes the circuit whereby the motor 15 is rotated in one or the other direction. The motor 15 will rotate and change the feeding of the propelling motor by means of the parts 16—21 in such a way that the aircraft again reaches the desired altitude and the indicator 1 reaches its zero position.

The described operation may be better illustrated by the following example of regulation cycles. The regulating device will be switched in at the time point $T_0$ and will maintain the aircraft in the desired altitude. At the time-point $T_1$ the aircraft will for instance pass into an airstream by which it is pressed down in such a way that its altitude diminishes about 100 m. in a very short time. With the beginning of the descent of the aircraft, that is at the time point $T_1$, the indicator 1 of the altimeter begins to deflect, indicating the falling of the aircraft. If after the time point $T_1$ the first depression of the bow 3 occurs, the indicator 1 will already be above one of the first contacts of the contact bank 2. The motor will be switched in in the above described manner and drive the contact disc 8 during a fraction of a second until the insulation-zone 10 interrupts the current. The described rotation of the contact disk 8 having taken place, the bow 3 will again be raised. After this regulation period the aircraft will still be falling on account of the influence of the airstream. However in consequence of the increased propelling force the aircraft is already tending to get the altitude to be maintained by the aircraft but the increased propelling force is not yet sufficient to compensate the influence of the airstream. In consequence of this the indicator 1 of the altimeter is further deflected. After a short time the second period of depression of the bow 3 will begin. In contrast to the first period the bow will now press down the indicator at a point of larger deflection, in consequence of which the motor 15 will be switched in and drive the contact disk 8 in the same sense as during the first period. The increasing of the propelling force due to this further regulation will now be sufficient to compensate the influence of the airstream and thereby bring back the aircraft to the original altitude. Therefore the indicator 1 of the altimeter will also return to its original position. In the meantime the third period of the movements of the bow 3 begins and the circuit is now closed by the other half-ring of the contact disk 8 in consequence of which the motor 15 will rotate in the opposite direction and diminish the propelling force of the aircraft in accordance with the return of the indicator 1 of the altimeter. By this regulation the tendency of the aircraft to ascend will be diminished. During the following periods of the movements of the bow 3 this tendency will further be diminished until the aircraft has reached its original altitude.

Every regulating cycle is finished by the displacing of the contact disk 8 by means of the motor 15 and the parts 16—18 and 22—25 and the switching off of the motor when the insulation zone 10 reaches that brush which is connected to the battery. The parts 22—25 connecting the axle 18 with the disk 8 do not influence the regulation in the example above described, but have for their purpose the development of an additional correction, if the propelling force is adjusted to a speed which is either too large or too small. In this case the aircraft will maintain a deviation from the desired altitude; in consequence thereof the indicator 1 will have a continuing deflection from the original position. In the damping device 22 the wheel of this device will assume a new position due to the influence of the spring 24. The wheel of the damping device is connected with the contact disk 8 by the axle 25 and the pin and slot connection 23 to which the spring 24 is connected. The combination of this spring and the damping device effects the described yielding regulation which is best and most promptly attained, if the period of influencing the propelling force is dependent on the angle of deflection of the indicator 1. As long as the deflections of the indicator 1 are small, the disk 8 is rigidly carried along with the damping device; as soon as the deflections of the indicator 1 become larger, the housing of the damping device will be dragged back relatively to the wheel of the damping device by the spring 24. Consequently as long as the indicator 1 moves near its zero position the contact disk 8 will be turned according to the whole deflection angle of the indicator, whilst during large deflections of the indicator the rotation of the disk 8 will be smaller than these deflections because the spring 24 in this case will move back the housing of the damping device 22 in such a way that the following movement of the axle 18 is partly stored in the damping device.

It is an important advantage of the described device that the lever 21 may be adjusted by the pilot without disturbing the automatic adjustment of this lever by the described regulating device.

With one of the elements, driven by the motor 15, switchers may be connected which are actuated for interrupting the motor-circuit when the lever 21 is in its end-positions.

In the embodiment according to Fig. 2 the damping device 22 and the elements 23 and 24 are omitted. There are the following new means: The indicator 1 of the altimeter moves not only along a contact bank 2 but also along a contact bank 27, consisting of two or more contacts separated by insulation zones. With the indicator 1 a bow, not shown, cooperates in the same manner as above described in relation to Fig. 1. By the action of this bow the indicator 1 will make contact not only with a contact of the contact bank 2 but also with the one of the contact pieces 27, as soon as the deflections of the indicator from its normal position become larger. By means of the said contact element of the contact pieces 27 a relay 32 will be excited; by the contacts 29 of this relay a small auxiliary motor 30 able to rotate in the clockwise or in the counterclockwise direction, is switched in. The motor 15, switched in in the manner described above in relation to Figure 1, during the contact-making of the indicator with the contact bank 2, adjusts the lever 21 regulating the propelling force of the one or more propelling motors. The lever 21 is further adjusted by the motor 30 by means of the differential gear 31.

The arrangement shown in Fig. 2 replaces the damping device 22, 23 of the embodiment illustrated in Fig. 1 and effects a small additional adjustment of the regulating element 21 by the motor 30 when the deflections of the indicator 1 reach a sufficient rate. If the deflection of the last mentioned rate continues for a longer time, by means of the arrangement according to Fig. 2 a new zero- or normal-position of the whole regulating device will be obtained, about which new position the altitude of the aircraft will be stabilized in the following time.

It may be well understood that the invention incorporated in the examples of Figs. 1 and 2 is not confined to these embodiments. For example, if several propelling motors are provided, the regulating levers of these motors may be actuated by the described regulating device simultaneously or one after the other. Instead of the motor 15 and the relay 13 other driving means may be used. The contact ring 7 and the contact disk 8 and also the contact bank 2 may be replaced by spring-actuated contact-sets, cooperating with thumb-disks resp. indicator 1.

In the embodiment illustrated in Fig. 3 the elements 1—25 are the same as in the embodiment of Fig. 1 and for this reason the same references for the same elements are used. The device according Fig. 3 can be varied by omitting the elements 34—39; this embodiment (without the elements 34—39) may be described at first.

The indicator 1 moving along the contact bank 2 is connected by means of the two-armed lever 40 to the diaphragm of the aneroid-barometer 41 as well as to the diaphragm of a variometer 42. The diaphragm of the barometer 41 is tensioned by the spring 43 according to the described altitude of the aircraft. For this purpose the one end of the spring 43 abuts against a member 45 sliding in a vertical cylinder 44. In the pilot cabin a hand-wheel 46 is provided, which enables the pilot to act by means of the flexible shaft 48 and spindle 49 upon the member 45 and the spring 43. The adjusted altitude will be indicated by an indicating device 47, 47', the scale 47 being coupled with the flexible axle 48 by means of a worm-gear.

The measuring chamber of the variometer 42 is not closed but communicates with the interior of the air box 50 which in turn by means of a tube 51 with adjustable throttle-valve 52, communicates with the atmosphere. The function of the illustrated variometer 42 is well-known; if the aircraft changes its altitude the pressure-variations arising in the measuring chamber of the variometer 42 will only slowly meet the atmospheric pressure grace to the box 50 and the throttle-valve 52. Consequently the deflection of the diaphragm will be approximately proportional to the velocity of the ascending or descending movement of the aircraft.

The diaphragms 41 and 42, the deflection of which are transferred to the indicator 1, must be nearly unstrained if an exact steering is to be obtained. For this purpose the position of the indicator is ascertained by an auxiliary force in form of the bow 3 which presses down the indicator 1 upon the contact bank 2 at periodic time-intervals.

As described in relation to Fig. 1 the function of the elements 1—25 is such that in consequence of the cooperation between the indicator 1 and the contact 2 on the one side and between the brushes 6 and the disk 8 driven by the motor 15 on the other side such an adjustment of the regulating lever 21 proportional to the deflections of the indicator 1 is obtained that the aircraft will attain the desired altitude in a damped oscillation. If however, as it has been assumed in relation to the embodiment of Fig. 1, the indicator 1 is subjected to the influence only of an altimeter, in the case of adjusting a new altitude which may differ from the foregoing about a rate of 1000 meters, the indicator will obviously have a deflection to the same side during the whole time needed by the aircraft for changing its altitude about the before-mentioned rate of 1000 meters. Consequently the propelling force of the aircraft, when the aircraft is attaining the new desired altitude, will be too large to maintain the aircraft in this desired new altitude during the following time. On the contrary the aircraft will go beyond the desired altitude and go definitely into this desired altitude after having made several oscillations about the desired altitude.

This disadvantage of the embodiment according to Fig. 1 will be prevented by the influence of the variometer 42, as this variometer brings back the indicator 1 into its normal position and moreover forces it to deflect to the opposite side, before the aircraft has attained the new desired altitude. When the ascending or descending of the aircraft is beginning, only the altimeter will act upon the indicator 1. As soon as, in consequence of the ascending or descending of the aircraft, the variometer 42 has obtained a certain deflection, this deflection will act upon the indicator 1 to diminish the total deflection of this indicator. The deflections of the diaphragms 41 and 42, proportional to the deviation from the desired altitude respectively to the vertical velocity of the aircraft, are proportioned one to the other in such a way that the indicator 1 is attaining its normal position considerably prior to the aircraft attaining its desired altitude. Moreover, before the new altitude is reached, the indicator 1 will deflect to the opposite side and will consequently effect a regulation of the propelling force in the opposite sense, in consequence of which the aircraft will be gradually propelled into the new desired altitude without oscillations about this altitude. In order to prevent a too sudden changing of altitude, an instrument measuring the vertical acceleration of the aircraft, for example a vertical pendulum of small oscillation period may be provided, cooperating with the above-mentioned instruments measuring the vertical velocity and the altitude. Instead of the last-mentioned alternative the described variometer may be replaced by an instrument for measuring the vertical acceleration. Also such a combination will fulfil the desired purpose.

The instrument for measuring the vertical velocity, used in the device according to Fig. 3, may also be of any other type, for example of the pendulum type, illustrated in Fig. 4. In this figure 55 designates a weight, fixed to the lever 54, turning about the axle 53. The said weight 55 is balanced by the spring 56. A piston 57 of a damping cylinder 58 filled with air, liquid or the like, is connected by means of its rod to the lever 54. The said damping cylinder 58 has a by-pass 59 with a throttle valve 59' interconnecting the two chambers of said cylinder. As long as the weight 55 is influenced by vertical accelerations, a force proportional to these accelerations acts upon the piston 57, in consequence of which this piston will move in the cylinder 58 according to the integrated accelerations, that is to the vertical velocity. This movement will be communicated to the one end of the lever 40, adjusting the indicator 1, the other end of this lever being adjusted by the aneroid-barometer 41. If the members 57—59 should be omitted, the deflection of the lever 54 would be proportional to the vertical acceleration, in consequence of which the indicator 1 would influence the regulating device, shown in Fig. 3, according to the difference between the deflection of the altimeter and the vertical acceleration.

Instead of the described superposing of the deflecting movements of the two measuring instruments, the deflection-forces of the two instruments may be compared one with the other as may be seen from Fig. 5. According to this figure the diaphragms of the instruments 41 and 42 are connected by a rod, which adjusts the indicator 1, turning about the pin 60, directly.

In the above description of the device according to Fig. 3 the elements 34—39 have not yet been considered. In contradistinction to the embodiment shown in Fig. 1 in the regulating device actuated by the indicator 1 a toothed wheel-segment 34 is fixed to the axle 18. This segment 34 engages a pinion 35, connected with the rotor of an hydraulic damping device 36. The housing of this damping device is not stationary but rotatably mounted by being connected to the axle 37 of the rotor of the damping device 22. The latter damping device 22 defers the received movement nearly unreduced to the contact disk 8 by means of the elements 23 and the axle 25. As long as the indicator 1 is moving along the contact bank 2, the throttle-channels of the damping device 22 are open. However as soon as the indicator gets its maximum deflection and touches the one or the other of the contacts 39 and 39', the electromagnet 38 will be switched in which, as is better illustrated in Fig. 3a, closes the throttle-pipes of the damping device 22 by means of a movable sheet, fixed to its armature. As a result the rotor of this damping device can not change its position relatively to the housing. Hence the damping device is entirely rigid. The damping effect of the device 34—36 is relatively small so that the rotor of this damping device may turn easily within the housing 36 as long as the velocity of the retrieving motion translated by said damping device is only small. In this case the spring 34', always tending to turn the housing of the damping device in opposite sense as the rotor of this device, will turn the housing and hence the axle 37. As the spring 34' is connected nearly to the middle of the toothed wheel-segment 34, the said turning movement is smaller than that turning movement transmitted to the axle 37 in case of sudden turning movements of the toothed wheel-segment 34 by means of the rotor of the damping device 36, as this rotor being in this case nearly rigid relatively to the housing and driven by the edge of the toothed wheel segment 34 that is by action of the whole length of the lever, consisting in the wheel-segment 34.

In consequence of the different length of the lever-arms acting upon the two parts of damping device 36, this damping device operates as a rigid one upon sudden retrieving movements but upon slow retrieving movements it will transmit only a fraction of the said movement to the axle 37.

The operation of the above described regulating device, steered by the indicator 1, may be set forth particularly by the description of the example, that the aircraft is changing its altitude from 1000 m. to 2000 m. As soon as the altimeter has been adjusted by the pilot to the new altitude of 2000 m, the indicator tends to assume a deflection corresponding to the amount of 1000 mts. As the length of the contact bank 2 corresponds only to an amount of 50 mtrs. of difference in altitude in regard to each direction, the indicator 1 will at once attain its end position at the contact 39 and 39' respectively. For the contact-time of the indicator 1 the electromagnet 38 will be energized and hence the damping device 22 will be rigid. As long as the indicator 1 remains in its end-position, that is as long as the aircraft is yet far from the new desired altitude, the said damping device 22 will remain rigid and therefore will periodically be switched in sense that it controls the lever 21 in a manner to augment the propelling force of the aircraft. Whilst the damping device 22 is rigid the other damping device 36 is enabled to store a certain amount of the retrieving movement transmitted from the motor 15 to the disk 8 this amount being determined by the tension of the spring 34'. This means practically that the regulating lever 21 will be in that moment in which the indicator 1 leaves the end-contact 39 or 39', farther adjusted than would be the case without provision of the damping device 36. As soon as, due to the return of the indicator 1 into its normal position, the retrieving movement received from the motor will reverse its direction, the damping device 36 will suddenly be returned and hence become nearly entirely rigid. Therefore the amount of the returning movement of the regulating lever 21 will be larger than it would be with regard to the returning movement of the indicator 1. Hence during the time interval, in which the indicator returns from the contact 39 or 39' into its illustrated middle-position, the propelling force of the aircraft is strongly throttled.

The arrangement, illustrated in Fig. 6, as regards its operation corresponds with the embodiment shown in Fig. 3. The only difference consists in the replacing of the damping device 22 of the combination of Fig. 3 by a velocity-change-gear. This gear will also be able to effect a phase-displacement between the movement of the indicator 1 and of the lever 21 regulating the propelling force of the aircraft for the purpose of accommodating the propelling force to the altitude just to be maintained or to other influences, for example to the atmospheric temperature or humidity, independently of the deflection of the altimeter. The damping device 36 is replaced by an hydraulic damping cylinder. The indicator 1 of the altimeter or the like will again be pressed down at periodic time-intervals upon the contact bank 2 by means of a bow 3, periodically actuated by an electromagnet 4. The contact bank 2 is in the manner shown in Fig. 3 electrically connected to a contact device, the brushes 6' of which being stationary and the counter-contacts 8' and 8'' of which being movable relatively to the said brushes. Immediately connected to the said countercontacts 8' and 8'' is the motor 15, in the circuit of which the indicator 1 and the contact bank 2 are located. The battery 15' serves for feeding the said circuit. The motor 15 adjusts again the regulating lever 21 by means of the worm-gear 16, 17 and the crank lever 20, fixed to the axle of the worm-wheel 17. The motor simultaneously effects the retrieving of the counter-contacts 8' and 8'' by means of the lever 64, fixed to the axle of the worm-wheel, damping device 65, rod 66, nut 67 and spindle 68. The nut 67 being threaded with the rod 66 carries the wheel 69. The disc 73 is being driven by bevel-gears 74 by the motor 75, rotating with constant speed. The motor also drives the time-switch 5 for the electromagnet 4 actuating the bow, by means of the worm gear 76.

As long as the oscillations of the air craft about the altitude adjusted at the altimeter are only small, the pendulous deviations of the indicator 1 relatively to the contact bank 2 are also very small. Consequently the motor 15 will accordingly adjust the regulating lever in the one or the other direction in such a manner that the propelling force will be a little increased or decreased. In this case as the retrieving movements take place suddenly the damping device 65 will act as a rigid member so that the piston 65' remains in its middle position. However if the lever 64 is deflected for a longer time interval or is deflected only slowly, the arm 64' will press back the cylinder 65 relatively to its piston 65' which is fixed to the end of the lever arm 64, by means of the springs 65''. This means a shortening or prolongation of the retrieving connection. In this way the adjusting of the lever 21 and therefore the regulating of the propelling force will be accommodated to the desired altitude near this altitude in such a way, that the aircraft will attain this altitude without oscillations. Hence the operation of the damping device 65 corresponds to that of the damping device 27 shown in Fig. 3.

Upon the movement of the rod 66 and the nut 67 in the one or the other direction, the wheel 69, carried by the said nut will also be moved into eccentric relation to the rotating disk 73. By this movement the wheel 69 will obtain a turning speed depending on the amount of its eccentrical displacement along the disk 73 rotating with constant speed. The said variable speed will be translated to the nut 67 with the result that this nut will be displaced along the rod to the one or the other side. The velocity of rotation of disk 73 and the ratio of the speed change-gear 69, 73 are so chosen, that the nut 67 will be moved along the spindle 68 in an imperceptible manner, as long as the eccentric displacement of the wheel 69 relatively to the disk 73 is only small and of only a short duration. Since, however, for maintaining the altitude adjusted at the altimeter, a larger changing of the propelling force will be necessary the indicator 1 will deviate to the same side for a longer time-interval so that the motor adjusts the regulating lever 21 for a larger amount. Simultaneously the displacement of the rod 66 and the contact pieces 8' and 8'' effected by the lever 64 will attain a larger amount so that the wheel 69 will be remain eccentrically displaced in the same direction for a larger amount and for a longer time interval. Then the turning movement of the nut 67 transmitted by the disk 73 will effect a corresponding shortening or enlargement of the distance between the spindle 68 and the rod 66, this continuing until by the displacement of the nut 67 along the spindle 68 the wheel 69 again reaches the centre of the disk 73 and thereafter ceases to rotate.

For preventing oscillations about the new desired altitude upon large deflections of the indicator 1, resulting from the adjustment of a new altitude at the altimeter, means are also provided in the embodiment according to Fig. 6 to make the elements 66—73 inoperative. For this purpose the diameter of the disk 73 is made so small that upon larger displacements of the rod 66 the wheel 69 will come out of engagement with the disk 73. Bearing on the axle of the worm-wheel 17 and affixed to lever 20 actuating the regulating lever 21 is a contact maker 77 which upon larger deflections engages stationary contacts 78 and 79, to which is electrically connected an indicating or signalling device, provided in the pilot cabin and indicating or signalizing the adjustment of the regulating lever 21.

In the beginning the contacts 78 and 79 are adjusted relatively to the regulating lever 21 in such a way that for a definite mode of flying a well adjusted position between the regulating lever and the regulating device will be obtained as to varying the propelling force. Each deviation from this position will be indicated to the pilot by means of the signalizing device, for example of optical signalizing elements such as glow lamps. The pilot therefore is required to note that no lamp is switched in and, if this is the case, to adjust the regulating lever so as to switch out the lamps.

I claim:

1. A device for automatically regulating the altitude of aircrafts comprising means for regulating the propelling force of the aircraft, an altimeter, and means influenced by said altimeter and acting upon said means for regulating the propelling force.

2. A device for automatically regulating the altitude of aircrafts comprising means for regulating the propelling force of the aircraft, an altimeter, means influenced by said altimeter and acting upon said means for regulating the propelling force, and further means for varying the rate of influence of said altimeter upon the said means for regulating the propelling force.

3. A device for automatically regulating the altitude of aircrafts comprising means for regulating the propelling force of the aircraft, an altimeter, means influenced by said altimeter and acting upon said means for regulating the propelling force, and manually adjustable means for compensating the directing force of said altimeter acting upon said regulating means for said propelling force.

4. A device for automatically regulating the altitude of aircrafts comprising means for regulating the propelling force of the aircraft, an altimeter and means influenced by said altimeter and acting upon said means for regulating the propelling force, and further means operable by hand for actuating said means for regulating the propelling force.

5. A device for automatically regulating the altitude of aircrafts comprising means for regulating the propelling force of the aircraft, an altimeter, means influenced by said altimeter and acting upon said means for regulating the propelling force, and further means for actuating said means for regulating the propelling force operable by hand independently of said means for automatically regulating the propelling force.

6. A device for automatically regulating the altitude of aircrafts comprising means for regulating the propelling force of the aircraft, a motor driving said means, a switching device for said motor, an altimeter operating said switching device, and a retrieving connection between said motor and said switching device.

7. A device for automatically regulating the altitude of aircrafts comprising means for regulating the propelling force of the aircraft, a motor driving said means, a switching device for said motor, an altimeter operating said switching device, a retrieving connection between said motor and said switching device, and a damping device in said retrieving connection.

8. A device for automatically regulating the altitude of aircrafts comprising means for regulating the propelling force of the aircraft, a motor driving said means, a switching device for said motor consisting of a contact bank and a contact element movable along said contact bank, an altimeter being in operative connection with said contact element, a retrieving connection between said motor and said contact bank, and a damping device in said retrieving connection.

9. A device for automatically regulating the propelling force of aircrafts comprising means for regulating the propelling force of the aircraft, an altimeter, an instrument measuring the rate of change of altitude, and means influenced by said altimeter and said measuring instrument and acting upon said means for regulating the propelling force.

10. A device for automatically regulating the propelling force of aircrafts comprising means for regulating the propelling force of the aircraft, an altimeter, an instrument measuring the acceleration of altitude, and means influenced by said altimeter and said measuring instrument and acting upon said means regulating the propelling force.

11. A device for automatically regulating the propelling force of aircrafts, comprising means for regulating the propelling force, a motor driving said means, a switching device for said motor, an altimeter, an instrument measuring the rate of change of altitude, an element differentially influenced by said altimeter and said instrument measuring the rate of change of altitude, said element controlling said switching device and a retrieving connection between said motor and said switching device.

12. A device for automatically regulating the propelling force of aircrafts comprising means for regulating the propelling force, a motor driving said means, a switching device for said motor consisting of a contact bank and a contact element movable along said contact bank, an altimeter, an instrument measuring the rate of change of altitude, an element differentially influenced by said altimeter and said instrument measuring the rate of change of altitude, said element controlling the contact bank of said switching device, a retrieving connection between said motor and said switching device, and a damping device in said retrieving connection.

13. A regulating device for automatically regulating the propelling force of aircrafts, comprising means for regulating the propelling force, an altimeter of the barometric type, a device for adjusting said altimeter from a distance according to the desired altitude, an instrument measuring the rate of change of altitude, and means influenced by said altimeter and said instrument measuring the rate of change of altitude and acting upon said means regulating the propelling force.

14. A device for automatically regulating the altitude of aircrafts comprising means for regulating the propelling force of the aircraft, a motor driving said means, a switching device for said motor, an altimeter operating said switching device, a retrieving connection between said motor and said switching device, a damping device in said retrieving connection, and means for controlling the damping intensity of the damping device.

15. A device for automatically regulating the altitude of aircrafts comprising means for regulating the propelling force of the aircraft, a motor driving said means, a switching device for said motor, an altimeter operating said switching device, and a retrieving connection between said motor and said switching device, said retrieving connection including a spindle with a nut movable along this spindle and carrying a wheel, slidable eccentrically to a constant driven disk.

16. A device for automatically regulating the altitude of aircrafts comprising means for regulating the propelling force of the aircraft, an altimeter, means influenced by said altimeter and acting upon said means for regulating the propelling force, further means for actuating said means for regulating the propelling force and operatable by hand, and a sliding clutch, connecting said two forms of actuating means with said means for regulating the propelling force.

17. A device for automatically regulating the altitude of aircrafts comprising means for regulating the propelling force of the aircraft, a motor driving said means, a switching device for said motor, an altimeter operating said switching device, a retrieving connection between said motor and said switching device, said retrieving connection including two damping devices, means for making the one of said damping devices rigid and being influenced by the altimeter, and means for confining the relative displacement of the parts of the other of said damping devices.

EDUARD FISCHEL.